United States Patent [19]

Gilmore et al.

[11] Patent Number: 4,657,212
[45] Date of Patent: Apr. 14, 1987

[54] AUTOMATIC CONDUIT ANCHORAGE DEVICE

[75] Inventors: William J. Gilmore, Manitou Beach; Leland E. Easter, Adrian, both of Mich.

[73] Assignee: Acco Babcock Inc., Fairfield, Conn.

[21] Appl. No.: 744,846

[22] Filed: Jun. 13, 1985

[51] Int. Cl.⁴ .............................................. F16L 5/00
[52] U.S. Cl. ...................................... 248/56; 411/21; 411/342; 24/141; 24/453; 24/611; 285/205
[58] Field of Search ................. 248/56, 221.3, 221.4, 248/231.9, 222.1; 16/2; 411/21, 22, 340, 341, 342, 345; 24/141, 453, 611, 609, 616; 285/162, 194, 205, 320

[56] References Cited

U.S. PATENT DOCUMENTS

| | | | |
|---|---|---|---|
| 912,364 | 2/1909 | Conrad | 16/2 X |
| 1,483,218 | 2/1924 | Fahnestock | 16/2 X |
| 1,822,259 | 9/1931 | Anderson | 285/320 X |
| 2,181,657 | 11/1939 | Herst | 411/342 |
| 2,424,757 | 7/1947 | Klumpp, Jr. | 16/2 X |
| 2,804,796 | 9/1957 | Devine | 411/426 X |
| 3,562,847 | 2/1971 | Jemison | 16/2 |
| 4,131,379 | 12/1978 | Gordy et al. | 16/2 X |
| 4,337,971 | 7/1982 | Kendrick | 285/320 X |

Primary Examiner—Ramon S. Britts
Assistant Examiner—Blair M. Johnson
Attorney, Agent, or Firm—Pennie & Edmonds

[57] ABSTRACT

A control cable anchor for securing a control cable in an opening having an elongated body with a shouldered end, axial slots in the body surface and locking pawls positioned within the slots. The pawls have a first end spaced from the shouldered end of the body which cooperates with the shouldered end to sandwich a wall which defines the opening. The pawls have a fulcrum point which engages the bottom of the slots. The pawls are biased into their first or locking position but may pivot about the fulcrum to be retracted at least partially beneath the body surface for insertion through the opening.

6 Claims, 5 Drawing Figures

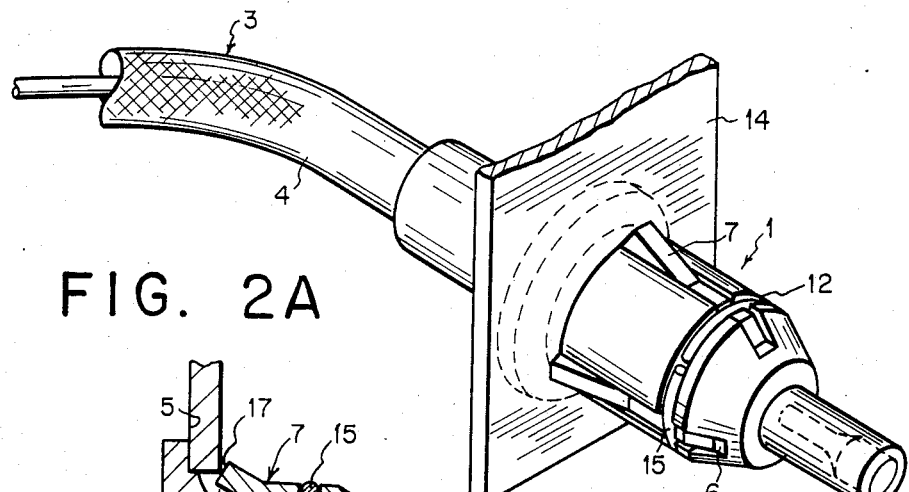
FIG. 1
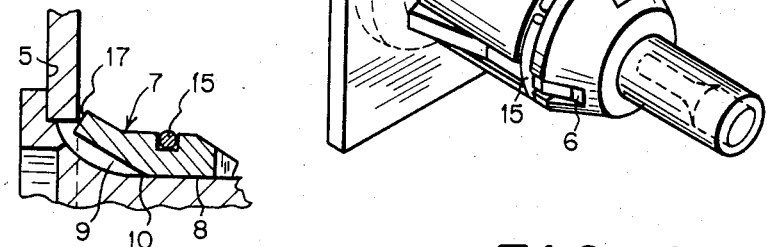
FIG. 2A
FIG. 2
FIG. 3
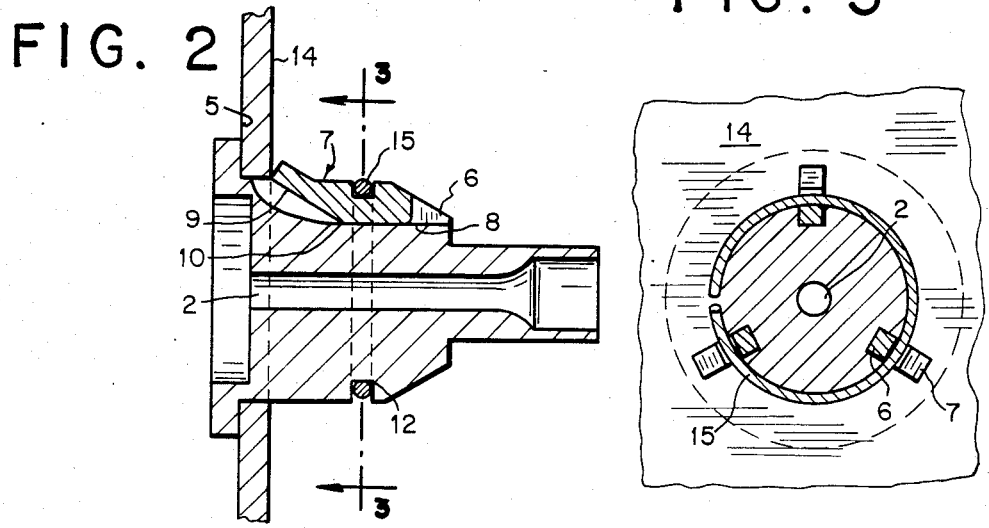
FIG. 4
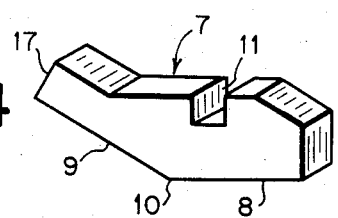

AUTOMATIC CONDUIT ANCHORAGE DEVICE

BACKGROUND OF THE INVENTION

1. Field of the Invention

The invention relates to anchoring devices and in particular to a self-locking anchorage device for use with a control cable for example of the cable and sleeve variety.

2. Description of the Related Art

In the use of control cables of the type having a casing and a core element axially translatable through the casing, it is necessary to anchor the casing so the core element may move relative to the casing. The casing is usually mounted in an opening through a wall or housing through which the cable passes. For example, the control cable may be used in automotive braking systems. In such a use, the casing or conduit would be mounted to the brake housing and the cable would pass through the housing such that it is axially slidable relative to the casing. When the brake peddle end of the control cable is actuated by moving the cable element relative to the casing, this motion is transmitted to the braking end of the control cable to apply the braking force.

In order to mount the casing to the brake housing opening, it is necessary to provide a quick attachment means for ease of assembly while also providing a sturdy connection and seal to prevent foreign matter from entering the brake housing.

U.S. Pat. No. 3,366,405 discloses one type of control cable anchoring device. The '405 anchor comprises a tubular body with locking prongs which are integral with the main body portion. The prongs of the '405 patent are portions of the body wall which are bent outward. In the anchoring device of the '405 patent, it is necessary to provide a resilient seat on the anchor in order to provide for the proper extension and positioning of the prongs. That is, in order to properly seat the '405 anchor, it is necessary to insert it beyond its anchoring position to allow the prongs to clear the opening and spring out.

Some known anchoring devices are formed of plastic. However, plastic may prove unsuitable for use in certain environments. Some breakage of the integrally formed prongs in all plastic anchorage devices occurs when the anchorage device is used in an engine compartment because the plastic degrades from long exposure to heat. In some instances the temperatures in the engine compartments of new model cars exceeds the heat tolerance of some present-day plastics.

SUMMARY OF THE INVENTION

The invention is an automatic anchorage device, for flexible conduit or control cables, which snaps into an opening. The anchor has a tubular body with at least two and preferably three locking pawls equally distributed about the circumference of the device. The tubular body is provided with slots around its circumference for receiving the pawls. The pawls are held in place by a round wire snap ring which fits into an annular groove in the tubular body.

The pawls are shaped with a fulcrum point which allows them to rotate between an outward and an inward position. The snap ring biases one end of each pawl radially inward which causes the opposite pawl end to be biased radially outward.

When the anchor is inserted through an opening in a wall, the sides of the opening force the pawls, due to their camming surface, to rotate inward against the tubular body. This allows the pawls to pass through the opening with minimal interference. The inward rotation of the pawls expands the snap ring by moving the ring-end of the pawl away from the tubular body. Once the pawls clear the opening, they pop back to their original position locking the device in the opening. The snap ring also provides restraint against axial motion of the pawls.

The pawls may be provided with an engaging surface which is angular to the wall defining the opening. In this way the anchor may be secured within the opening without axial motion.

BRIEF DESCRIPTION OF THE DRAWINGS

FIG. 1 is a perspective view of the anchor of the invention inserted through an opening.

FIG. 2 is a cross-sectional view of the anchor of the invention inserted through an opening.

FIG. 2A is a partial cross-sectional view of the anchor in alternative locking position.

FIG. 3 is a view along line 3—3 of FIG. 2.

FIG. 4 is an enlarged perspective view of the locking pawl of the invention.

DESCRIPTION OF THE PREFERRED EMBODIMENT

The anchor includes a generally cylindrical body 1 which defines an axial passage 2. The axial passage 2 is adapted to slideably receive the core member of a control cable 3. The body 1 is constructed at a first end to receive and hold the casing member 4 of control cable 3. The first end of body 1 also is formed as a portion of greater diameter than the remainder of the body. This creates a shoulder 5 which is larger in size than the opening in which the anchor will be mounted.

The body 1 is provided with axially extending slots 6 in its outer surface. The number of axial slots depends on the number of anchoring pawls 7 that the anchor is to have. In the preferred embodiment, the anchor is provided with three equally spaced slots, that is, each slot is spaced about the circumference of the body an equal distance from the other two slots. The slots are formed with opposing sidewalls and a bottom surface. Each slot 6 is adapted to receive a locking pawl 7 (FIG. 4).

The pawls 7 have a base portion and an arm portion ending in a first end. When the pawl is in a first position, the bottom surface 8 of the base portion is in face-to-face contact with the bottom surface of its receiving slot 6. Surface 8 extends from a second end of the pawl 7 for approximately one-half the overall length of pawl 7. Surface 8 meets lower surface 9 of the arm portion at approximately a 150° angle. In this way when the pawl is positioned with its bottom surface 8 in face-to-face contact with the slot (the normal position) the lower surface 9 of the arm portion is at a 30° angle to the bottom surface of the slot. Therefore the arm portion of pawl 7 extends away from and above the base portion. Because of its shape, the pawl 7 is able to rotate about fulcrum point 10 which is formed at the intersection of surfaces 8 and 9 between the first and second end of pawl 7. The pawl can pivot or rotate 30° from a first position (the normal position) to a second position where lower surface 9 is in face-to-face contact with the bottom of slot 6. When in the second position, the arm portion of pawl 7 is received within slot 6 substantially below the outer surface of body 1.

The pawl 7 is provided with a notch or groove 11 which matches an annular groove 12 provided in the surface of body 1. As is seen, the location of grooves 11 and 12 will determine the clearance between engaging surface 13 and shoulder 5. The desired clearance is in turn determined by the predetermined thickness of wall 14 to which the anchor is to be mounted. The clearance should be the same as the predetermined thickness of the wall.

The notch 11 and annular groove 12 receive biasing means. In the prefered embodiment the biasing means is a spring snap ring 15. When the pawls 7 are positioned within slots 6 and snap ring 15 is placed within the notches 11, which are preferably located between fulcrum point 10 and the second end of pawl 7 and annular groove 12, the pawl is biased into its first position by the radially inward compressive force of the snap ring 15. In its first position, the first end of pawl 7 is raised out of the slot 6. At the same time the pawl 7 is held in its predetermined axial position relative to shoulder 5 by the snap ring 15 preventing any axial motion of the pawl.

The pawls and body are cast from zinc or other suitable material. The material selected should be able to withstand extended and repeated exposures to high temperatures. The body should be of such size as to fit snugly within the opening it is to be mounted. If desired the body surface may be provided with a small longitudinal ridge for mating with a notch in the support bracket opening to prevent rotation of the anchor once it is mounted.

To install the anchor, the second end of body 1 is inserted through the opening in which the anchor is to be mounted. In order to facilitate the insertion, the second end may be tapered slightly toward the end. At this point the pawls 7 are in their first position. As the body is inserted further, the walls of the opening meet surface 16 of the pawl and urge the arm portion of the pawl into the slot. This causes the pawl to move to its second position which permits insertion of the anchor by rotating about fulcrum 10 and against the biasing force of snap ring 15. As the body is inserted further, the pawl 7 clears the opening and is biased back to its first position by snap ring 15. At this point engaging surface 17 at a first end of the pawl is in contact with the edge of the back surface of the wall and by cooperating with shoulder 5 prevents any axial motion of the anchor. As shown in FIG. 2A, the engaging surface 17 may engage a corner of the opening if the opening is too large for the first end of the pawl to expand beyond the opening or if the pawl is restricted from opening fully. Alternatively, as shown in FIG. 2, the pawl may engage the back surface of the wall.

As is seen in FIGS. 2 and 4, engaging surface 17 meets surface 9 at approximately a 90° angle. In this way engaging surface 17 is not in face-to-face contact with the wall. This eliminates the need for resilient means at the first end of the anchor which are found in prior art devices. Rather than having it be necessary to insert the anchor far enough to clear the pawls and then pull the pawl back into engagement with the wall, the angular engaging surface allows the pawl to rotate back towards its first position before full insertion and still hold even when deviations in clearance or wall thickness do not allow the pawl to return completely to its first position.

We claim:

1. An anchoring device for securing a control cable conduit assembly to an opening in a support wall, having a predetermined thickness, comprising:
   (a) an elongated body having a shouldered end which is larger in size than said opening and a front end which is smaller;
   (b) axially extending slot means extending long the outer surface of said body;
   (c) locking pawl means positioned within said slot means, said pawl means having
      (1) a first end spaced from the shouldered end of said body by a distance equal to the predetermined thickness of said support wall;
      (2) a second end spaced from said first end,
      (3) a fulcrum point between said ends engaging the bottom of said slot means and about which said pawl pivots from a first position in which the first end is raised out of said slot means by a distance sufficient to interfere with axial movement of said anchoring device through the opening in said support wall and a second position permitting movement of said anchoring device through said opening; and
      (4) a groove in the outer surface of said pawl means between said fulcrum point and second end thereof;
   (d) an annular groove extending circumferentially along the outer surface of said body, said annular groove having substantially the same width and depth as said groove in the outer surface of said pawl means, the annular groove and the groove in the pawl means being substantially aligned; and
   (e) an annular ring, disposed within said circumferential groove in said body and said groove in said pawl means, to bias said pawl means into said first position and to hold said pawl means against axial movement in said slot means.

2. An anchoring device according to claim 1 wherein:
   (a) said body includes three axially extending slots extending along its outer surface and disposed in equally spaced relation about the circumference thereof; and
   (b) said pawl means included a separate pawl disposed in each of said slots.

3. An anchoring device according to claim 2 wherein:
   (a) each of said pawls is of a dimension between said fulcrum point and its second end to wholly fit within said slot when biased into said first position.

4. An anchoring device according to claim 3 wherein:
   (a) each pawl between said fulcrum point and its first end extends at an acute angle to the longitudinal axis of the body to provide a camming surface for engagement with the wall surface of the opening in the support wall as the anchoring device is inserted through said opening, front end first.

5. An anchoring device according to any one of claims 2, 4 and 1 wherein:
   (a) said pawl means includes a bottom surface having the portion thereof between the fulcrum point and its first end extending at an angle to the portion between the fulcrum point and its second end.

6. An anchoring device according to claim 5 wherein:
   (a) the two bottom portions of the bottom surface of the pawl means are flat surfaces extending at an angle of about 150° to each other.

* * * * *